US005669111A

United States Patent [19]
Rohaly

[11] Patent Number: 5,669,111
[45] Date of Patent: Sep. 23, 1997

[54] CABLE TIE HAVING A STRENGTHENED NECK AREA

[75] Inventor: Joseph S. Rohaly, Frankfort, Ill.

[73] Assignee: Panduit Corp., Tinley Park, Ill.

[21] Appl. No.: 570,999

[22] Filed: Dec. 12, 1995

[51] Int. Cl.⁶ .................................................. B65D 63/00
[52] U.S. Cl. ................ 24/16 PB; 24/17 AP; 24/30.5 AP
[58] Field of Search ....................... 24/16 PB, 17 AP, 24/30.5 P

[56] References Cited

U.S. PATENT DOCUMENTS

| D. 205,659 | 9/1966 | Piasecki . | |
|---|---|---|---|
| D. 205,940 | 10/1966 | Miller . | |
| 3,186,047 | 6/1965 | Schwester et al. . | |
| 3,965,538 | 6/1976 | Caveney et al. . | |
| 5,267,373 | 12/1993 | Chisek | 24/16 PB |
| 5,293,669 | 3/1994 | Sampson | 24/16 PB |
| 5,317,787 | 6/1994 | Fortsch | 24/16 PB |
| 5,414,904 | 5/1995 | Sampson | 24/17 AP X |
| 5,440,786 | 8/1995 | Sorensen et al. | 24/17 AP X |
| 5,457,853 | 10/1995 | Klein | 24/16 PB |

*Primary Examiner*—James R. Brittain
*Assistant Examiner*—Stephen Vu
*Attorney, Agent, or Firm*—Mark D. Hilliard; Robert A. McCann

[57] ABSTRACT

A cable tie having a reduction in occurrences of neck breaks is provided by positioning a knockout impression adjacent the cable tie head and providing strengthening gussets along the strap and extending past the knockout impression area.

3 Claims, 3 Drawing Sheets

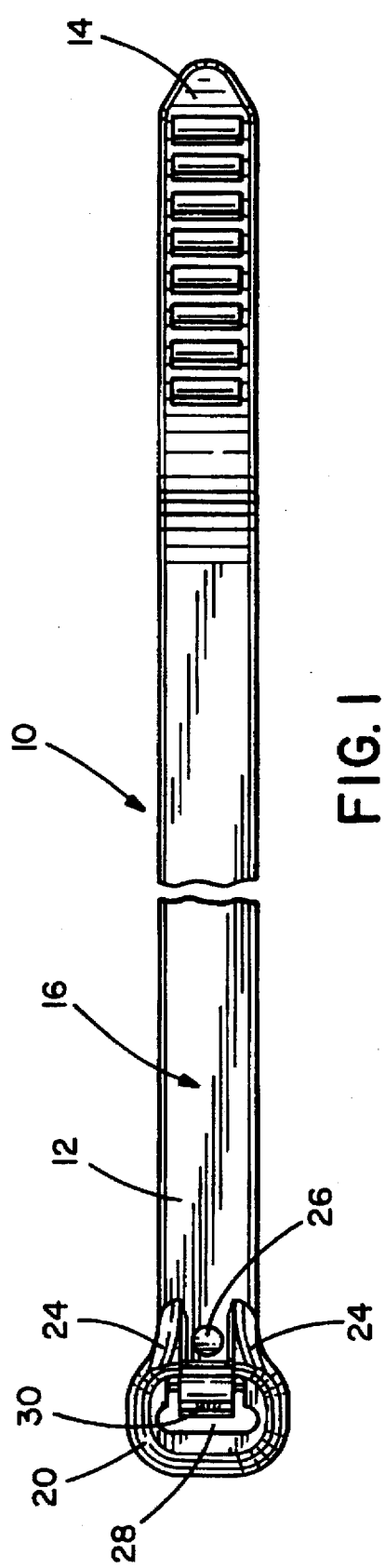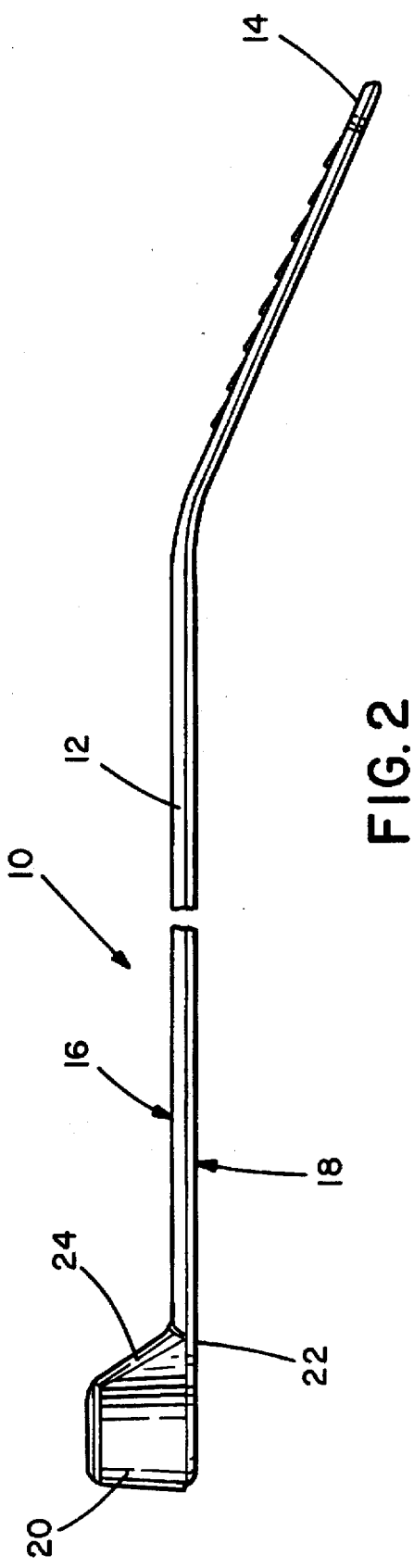

5,669,111

CABLE TIE HAVING A STRENGTHENED NECK AREA

TECHNICAL FIELD

The present invention relates to cable ties and the method of manufacturing cable ties and more particularly to a cable tie in which a knockout for ejecting the tie from its mold cavity has been positioned on the strap so as to form a knockout impression area entirely within an area formed in between strengthening gussets adjacent the head of the cable tie.

BACKGROUND OF THE INVENTION

Cable ties are well known in the electrical industry for bundling wires and cables. The vast majority of cable ties are manufactured by injection molding of a thermoplastic material. Cable ties generally include a strap body with a free end and a locking head at the opposite end. The area of the strap adjacent the head is commonly referred to as the neck of the cable tie.

During the manufacture of cable ties, two halves of a mold containing a cavity forming the cable tie are brought together and injected with the thermoplastic material. When the mold halves are separated, the cable tie is retained in one side of the mold cavity. Therefore, it is necessary to provide knockouts formed in one side of the mold cavity in order to remove the cable tie from that mold cavity. These knockouts, however, create knockout impression areas which indicate areas which are areas of changed properties on the cable tie strap. Prior cable ties have been made using a plurality of knockouts along various locations of the cable tie, including the cable tie head and both the top and bottom sides of the strap body. Prior cable ties are known which are provided with strengthening gussets integrally formed to the head at the neck of the cable tie. In those situations in which it is not desirable or feasible to position a knockout directly on the head, it is advantageous to position a knockout on the neck of the strap body relatively close to the head or gussets in order to properly remove the cable tie head from the mold cavity. This placement of a knockout on the neck area of the strap body creates a weakened area at a location on the strap that is highly susceptible to fracturing due to the bending which occurs in this area, particularly during application of the cable tie to small bundles. Therefore, improvement in the art is needed.

SUMMARY OF THE INVENTION

It is, therefore, an object of the present invention to provide an improved cable tie.

It is further an object of the present invention to provide an improved method of manufacturing a cable tie.

It is still further an object of the present invention to provide a cable tie manufactured by a method which reduces the neck breaks occurring during application of the cable tie.

In general, a cable tie according to the present invention includes a strap with a first end and a free end and a locking head secured to the first end of the strap, and has a knockout impression area positioned on a top side of the strap adjacent the locking head, and strengthening gussets provided on lateral edges of the strap and extending along the strap from the locking head completely past the knockout area.

Generally, the cable tie of the present invention is manufactured by providing a mold cavity that forms a cable tie having a strap with a first end and a free end and a locking head integral to the first end of the strap and strengthening gussets provided on lateral edges of the strap and extending from the head along the strap towards the free end and providing a knockout to the mold cavity positioned fully within the area on the strap between the strengthening gussets.

BRIEF DESCRIPTION OF THE DRAWINGS

FIG. 1 is a plan view of a cable tie of the present invention.

FIG. 2 is a side view of the cable tie of FIG. 1.

DESCRIPTION OF THE PREFERRED EMBODIMENT

Figure 3:
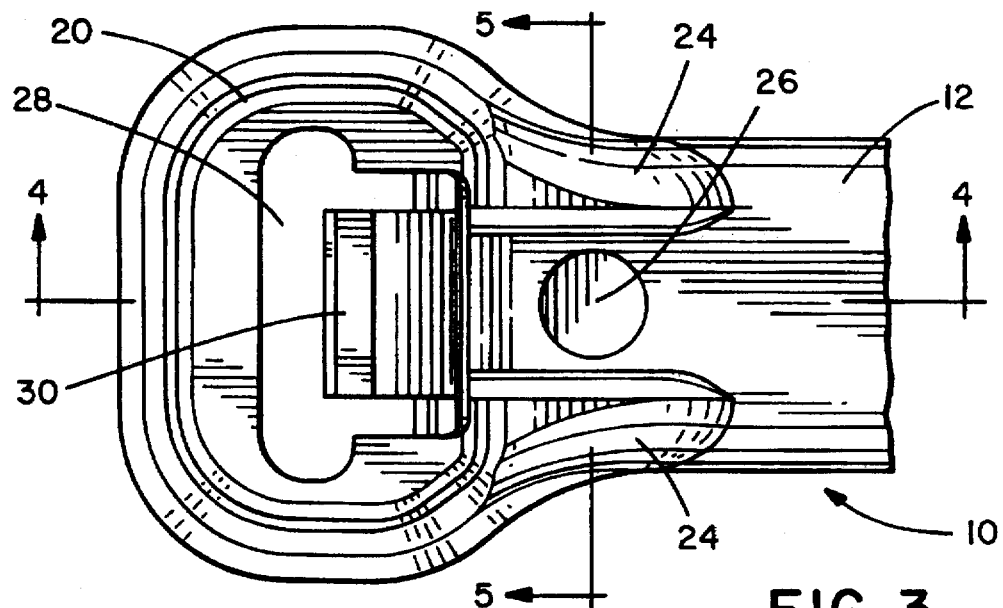
FIG. 3 is an enlarged sectional view of the head end portion of the cable tie of FIG. 1.

A cable tie embodying the concept of the present invention is designated generally by the reference numeral 10 in the accompanying drawings. As seen in FIGS. 1 and 2, cable tie 10 includes a strap body 12 having a free end 14 and a locking head 20 at the opposite end. Strap body 12 has a top or outer side 16 and a bottom or inner side 18. The area along strap 12 adjacent head 20 is commonly referred to as the neck area 22. In use, the free end 14 of the strap 12 is wrapped around a bundle and inserted through strap passageway 28 of locking head 20. The strap 12 is prevented from being withdrawn by a pawl 30 engaging with teeth (not shown) formed on the strap 12.

Figure 6:
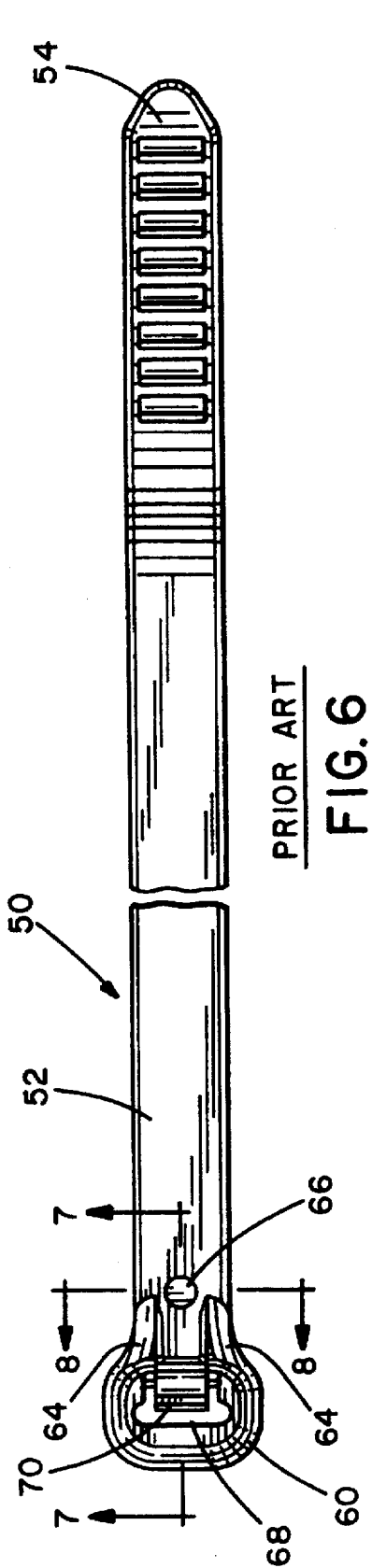
FIG. 6 is a prior art cable tie.
Figure 8:
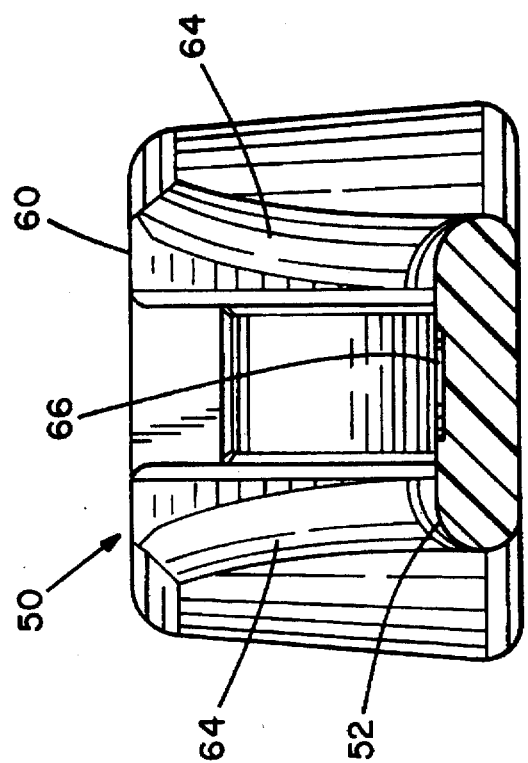
FIG. 8 is a sectional view taken along lines 8—8 of FIG. 6.
Figure 7:
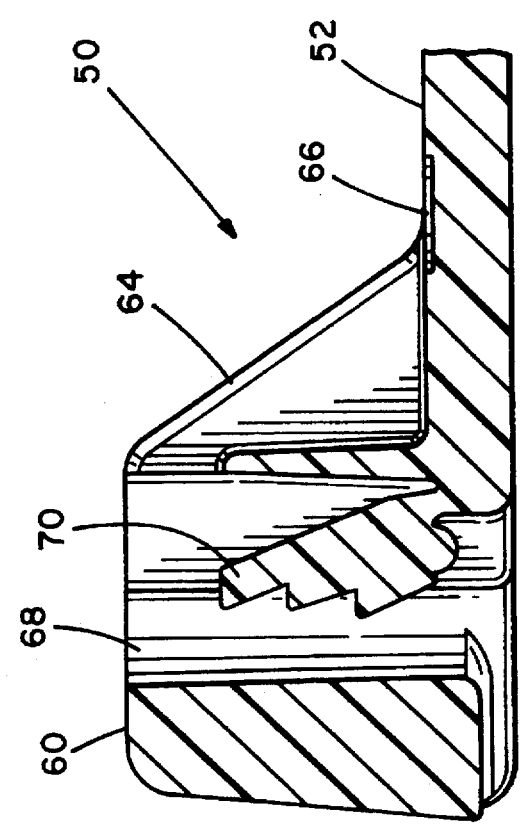
FIG. 7 is a sectional view taken along lines 7—7 of FIG. 6.

As discussed above, knockout pins are utilized in the molding process to remove cable ties from one of the mold cavities. A prior art cable tie 50 includes a strap body 52 having a free end 54 and a locking head 60 at the opposite end. In use, the free end 54 of the strap 52 is wrapped around a bundle and inserted through strap passageway 68 of the locking head 60 and engages with a locking pawl 70. The prior art cable tie 50 also includes having a knockout impression area 66 resulting from a knockout pin is shown in FIG. 6. The knockout pin (not shown) creates impression 66, which due to the thermoplastic material being notch sensitive, results in an area of concentrated stress on the strap at the knockout impression area 66. While the knockout impression 66 has been shown to be formed as a slight circular depression it is to be understood that the knockout pin might also create a slight raised area or leave an even surface surrounded by a witness line which indicates where the knockout pin contacted the surface and created the weakened area. This weakened area creates a propensity for the strap 12 to break at the knockout impression area 66 during application of the cable tie 50 to a small bundle. As best seen in FIGS. 6 and 7, prior art cable ties 50 having knockout impressions 66 formed near the head have not positioned the knockout within a recess formed between the strengthening gussets 64.

Figure 4:
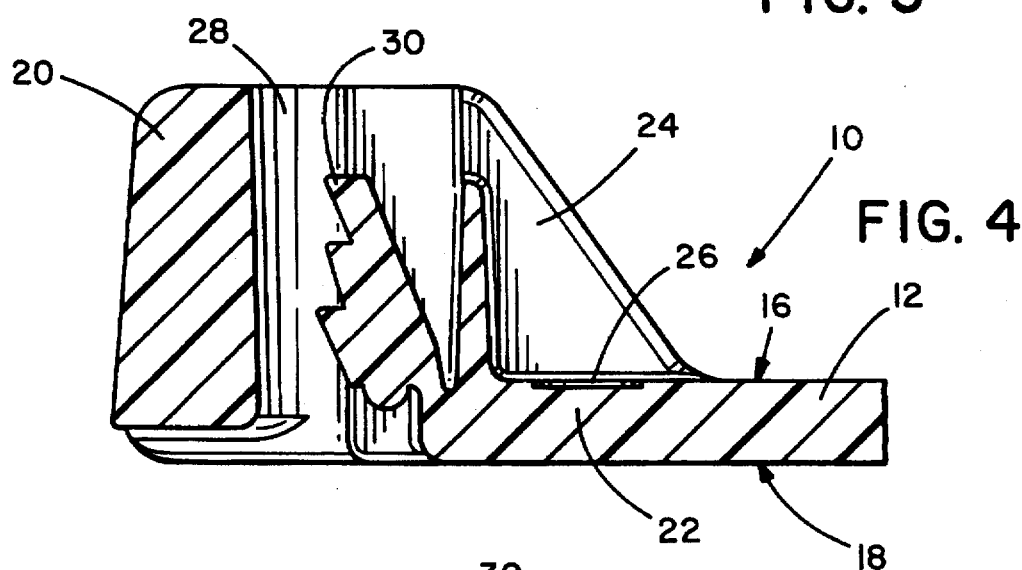
FIG. 4 is a sectional view of the cable tie head of FIG. 3 taken along lines 4—4.
Figure 5:
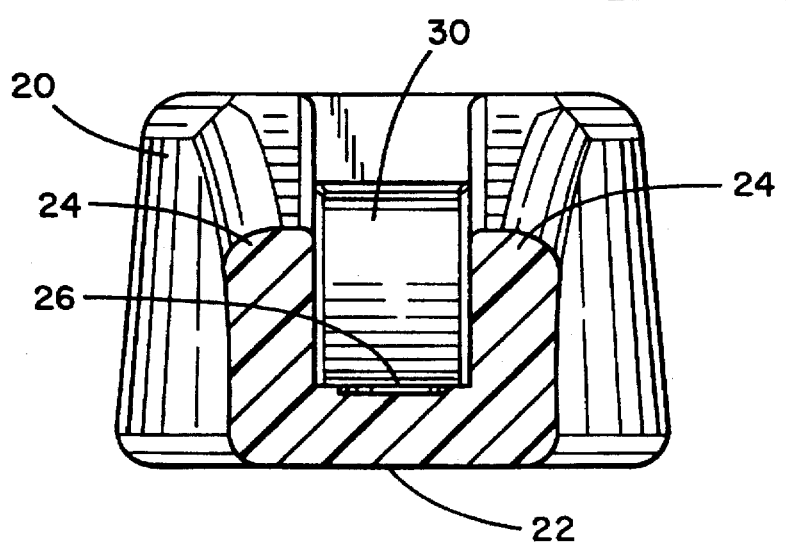
FIG. 5 is a sectional view of the cable tie taken along lines 5—5 of FIG. 3.

Only the placement of a knockout impression 26 fully in between the strengthening gussets 24, as shown in the preferred embodiment of FIGS. 3 and 4, provides the most protection against neck breaks during application of cable ties 10 resulting from the stress concentrations in the knockout impression area 26.

It is to be noted that while the invention has been shown and described on a certain style one-piece all plastic cable tie, that it will be obvious to a person skilled in the art that the invention can be used on a wide variety of cable tie styles including a two-piece cable tie with a metal locking device. Therefore, while the particular embodiment of the present invention has been shown and described, it will be obvious to those skilled in the art that changes and modifications may be made without departing from the invention in its broader aspects. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A cable tie having a strap with a first end and a free end and a locking head secured to the first end of the strap, comprising:

a knockout impression area positioned on a top side of the strap adjacent the locking head; and strengthening means provided on the strap and extending along the strap from the locking head such that an end portion of the strengthening means extends past a midpoint of and substantially fully through the knockout impression area for preventing neck breaks caused by stress concentrations in the knockout impression area.

2. A cable tie according to claim 1, wherein the strengthening means is a pair of gussets disposed on lateral edges of the strap.

3. A cable tie according to claim 2, wherein the strengthening means extend past the knockout impression area.

* * * * *